(12) United States Patent
Takayanagi et al.

(10) Patent No.: US 6,800,377 B2
(45) Date of Patent: Oct. 5, 2004

(54) MULTILAYER SLIDING MATERIAL

(75) Inventors: Satoshi Takayanagi, Nagoya (JP); Hideo Tsuji, Nagoya (JP); Masahito Fujita, Nagoya (JP); Takayuki Shibayama, Nagoya (JP)

(73) Assignee: Daido Metal Company Ltd., Nagoya (JP)

(*) Notice: Subject to any disclaimer, the term of this patent is extended or adjusted under 35 U.S.C. 154(b) by 0 days.

(21) Appl. No.: 10/222,804

(22) Filed: Aug. 19, 2002

(65) Prior Publication Data

US 2003/0099855 A1 May 29, 2003

(30) Foreign Application Priority Data

Sep. 19, 2001 (JP) ........................................ 2001-284906

(51) Int. Cl.[7] .......................... B32B 7/02; B32B 15/01; B32B 15/18; B32B 15/20
(52) U.S. Cl. ........................ 428/645; 428/677; 384/912
(58) Field of Search ................................. 428/645, 677; 384/912

(56) References Cited

U.S. PATENT DOCUMENTS

| | | | |
|---|---|---|---|
| 4,206,268 A | | 6/1980 | Roemer et al. |
| 5,056,937 A | | 10/1991 | Tanaka et al. |
| 5,300,368 A | * | 4/1994 | Kubert et al. ............... 428/610 |
| 5,328,772 A | | 7/1994 | Tanaka et al. |
| 5,543,236 A | | 8/1996 | Tanaka et al. |
| 5,803,614 A | * | 9/1998 | Tsuji et al. ................. 384/276 |
| 5,911,513 A | * | 6/1999 | Tsuji et al. ................. 384/276 |
| 5,976,712 A | | 11/1999 | Staschko et al. |
| 6,575,635 B1 | * | 6/2003 | Tsuji et al. ................. 384/276 |

FOREIGN PATENT DOCUMENTS

| | | |
|---|---|---|
| EP | 0 143 449 A2 | 6/1985 |
| GB | 605593 | 7/1948 |
| GB | 658335 | 10/1951 |
| GB | 705863 | 3/1954 |
| GB | 714681 | 9/1954 |
| GB | 718073 | 11/1954 |
| GB | 832396 | 4/1960 |
| GB | 2 240 343 A | 7/1991 |
| GB | 2 271 180 A | 4/1994 |
| JP | 3-274237 | 12/1991 |
| JP | 61-266544 | 11/1996 |

OTHER PUBLICATIONS

Abstract, CH 658 671 A5, *Patent Abstracts of Switzerland*, Inventor: Omar SULTAN, Published: Nov. 28, 1986.

* cited by examiner

*Primary Examiner*—Deborah Jones
*Assistant Examiner*—Jason Savage
(74) *Attorney, Agent, or Firm*—Browdy and Neimark P.L.L.C.

(57) ABSTRACT

There is provided a multi-layer sliding material, comprising a back metal layer, a bearing alloy layer bonded onto the back metal layer, and a coating layer bonded onto the bearing alloy layer, said coating layer being made of an alloy consisting of 20 to 80 mass % Pb, at least one optional element not more than 10 mass % in total selected from the group consisting of In, Sb, Sn and Ag, and the balance Cu and incidental impurities. The material may further comprise a conforming layer made of an alloy containing not less than 80 mass % Pb.

20 Claims, 1 Drawing Sheet

MULTILAYER SLIDING MATERIAL

BACKGROUND OF THE INVENTION

The present invention relates to a multi-layer sliding material comprising a bearing alloy layer and a Cu-based alloy layer bonded onto the bearing alloy layer which Cu-based alloy layer acts to enhance the fatigue resistance and the wear resistance of the multi-layer sliding material.

In prior arts, a bearing used in an engine is constituted to have a back metal layer made of a steel which back metal layer has a semi-cylindrical or cylindrical shape, and a bearing alloy layer made of a Cu-based bearing alloy or an Al-based bearing alloy which bearing alloy layer is bonded onto the back metal layer. The Cu-based or Al-based bearing alloy is superior regarding the load carrying capacity, however, it is inferior regarding other characteristics required in the bearing such as anti-seizure property, embeddability, conformability and etc. To improve this problem, the conventional bearing is made to have a conforming layer provided on the bearing alloy layer so that the bearing characteristics may be improved.

Hitherto, a conforming layer provided on a Pb—Cu bearing alloy layer is made to contain not more than 6 mass % Cu, which is dispersed in the Pb-based matrix of the conforming layer to thereby strengthen the matrix. The advantage brought about by this Cu is disclosed in JP-A-61-266544. However, even in the case of the alloy used as the surface layer of a sliding material disclosed in this publication, the fatigue resistance and wear resistance of this alloy are insufficient when the alloy is used as the conforming layer.

SUMMARY OF THE INVENTION

The invention is achieved in taking the above-explained circumstances of the prior art into consideration, and the object of the invention is to provide a multi-layer sliding material having superior fatigue resistance and superior wear resistance.

According to the first aspect of the invention, there is provided a multi-layer sliding material, comprising a back metal layer, a bearing alloy layer bonded onto the back metal layer, and a coating layer bonded onto the bearing alloy layer, said coating layer being made of an alloy consisting of 20 to 80 mass % Pb, and the balance Cu and incidental impurities.

In the multi-layer sliding material of the invention, the hardness of the coating layer becomes high because the content of the balance Cu contained in the coating layer is in the range of 20 to 80 mass %, so that the fatigue resistance and wear resistance of the sliding material are enhanced. In a case where the content of Cu is less than 20 mass %, the hardness-raising effect of Cu becomes small with the result that the enhancement of each of the fatigue resistance and the wear resistance becomes insufficient. In another case where the content of Cu exceeds 80 mass %, the hardness of the coating layer becomes excessively high with the results that the initial conformability thereof is lowered, that the anti-seizure property thereof is also lowered, and that the fatigue resistance thereof decreases due to the decrease in the toughness of the coating layer.

Each of Pb and Cu, which are substantially evenly dispersed in the coating layer as an amorphous state prior to the use of the sliding material, comes to be precipitated as crystal grains due to heat occurring during the use thereof. Thus, the Pb crystal grains present on the surface act to enhance the anti-seizure property of the sliding material with the Cu crystal grains acting to enhance both of the wear resistance and fatigue resistance. Namely, the coating layer comes to have an enhanced fatigue resistance and an enhanced wear resistance while maintaining a good lubrication on the surface of the coating layer.

The bearing alloy layer may be made of a Cu-based alloy containing 5 to 30 mass % Pb or an Al-based alloy containing not more than 20 mass % Sn, which Cu-based alloy may further contain 2 to 15 mass % Sn and/or 0.01 mass % P and which Al-based alloy may further contain 2 to 7 mass % Si.

Sn contained in the Al-based bearing alloy layer is a soft metal similarly to Pb. It is preferred that the content of the soft metal (, that is, Pb or Sn) contained in the bearing alloy layer is less than that of the soft metal (Pb) contained in the coating layer. By selecting the contents of the soft metals in this manner, the hardness decreases in the order of the bearing alloy layer and the coating layer, so that such functions of each of them as the bearing alloy layer bears a load and as the coating layer brings about other bearing characteristics can be effectively exerted.

In the coating layer, at least one not more than 10 mass % in total selected from the group consisting of In, Sb, Sn and Ag may be added, which at least one acts to enhance the mechanical strength of the coating layer and the corrosion resistance thereof. In a case where the total amount of the at least one of the additive elements exceeds 10 mass %, the wear resistance of the coating layer is deteriorated.

Further, a conforming layer containing not less than 80 mass % Pb may be provided on the coating layer as occasion arises. Namely, since the coating layer contains a relatively much amount of Cu, the hardness thereof becomes high, so that the initial conformability thereof becomes insufficient in certain cases. In this case, by providing the soft conforming layer containing a much amount of Pb, the initial conformability of the sliding material can be improved while enhancing the anti-seizure property thereof.

Further, the conforming layer may be made of an alloy consisting of not less than 80 mass % Pb, and at least one optional element not more than 20 mass % in total selected from the group consisting of Sn and Cu.

In this case of providing the conforming layer, it is preferred that the hardness of each of the bearing alloy layer, the coating layer and the conforming layer decreases in this order. Namely, it is preferred that the Cu-based alloy and the Al-based alloy each used as the bearing alloy layer have hardness ranges of 75 to 200 Hv and 30 to 150 Hv, respectively, that the coating layer has a hardness range of 20 to 180 Hv, and that the conforming layer has a hardness range of 5 to 20 Hv. Further, it is preferred that the coating layer has a thickness of 10 to 20 μm and that the conforming layer has a thickness of 2 to 10 μm. In addition, a metal layer of Ni etc. may be provided, as a bonding layer, between the bearing alloy layer and the coating layer.

DESCRIPTION OF THE PREFERRED EMBODIMENTS

Figure 1:
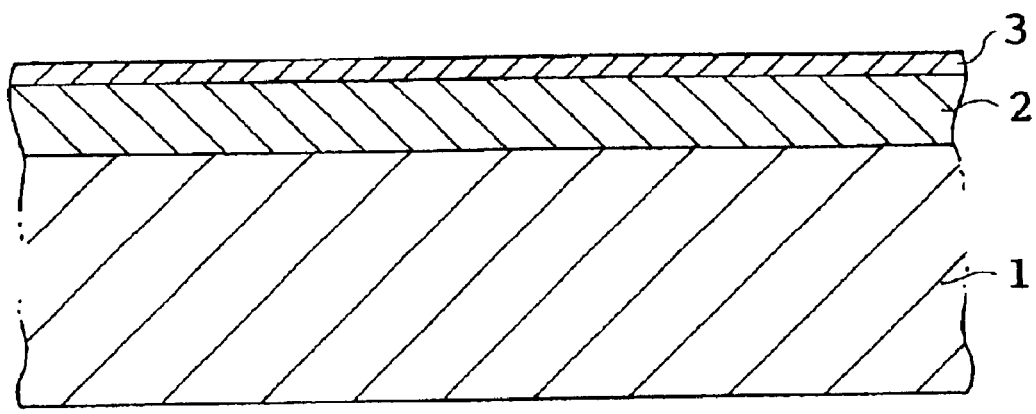
FIG. 1 is a partial, sectional view of a multi-layer sliding material according one embodiment of the invention.

FIG. 1 shows the cross section of a multi-layer sliding material according to the first embodiment of the invention, which sliding material comprises a steel back metal layer 1, a bearing alloy layer 2 bonded onto the steel back metal layer 1, and a coating layer bonded onto the bearing alloy layer by an electroplat-ing technique. The coating layer 3 is made of an alloy consisting of 20 to 80 mass % Pb (lead), and the balance Cu (copper) and incidental impurities. In this coating layer 3, there may be added at least one not more than 10 mass % in total selected from the group consisting of In (indium), Sb (antimony), Sn (tin) and Ag (silver).

were produced, by use of the multi-layer sliding materials of the embodiments, sliding bearing samples Nos. 1 to 14 shown in Table 1, and there were produced comparative sliding bearing samples Nos. 1 to 4 by use of comparative multi-layer sliding materials which samples are also shown in Table 1. In Table 1, the numerical value before each of the atomic symbols indicates the content (mass %) of the element.

TABLE 1

| No. | bearing alloy layer composition | Hv | coating layer composition | Hv | conforming layer composition | Hv | maximum specific load without seizure (MPa) | maximum specific load without fatigue (MPa) | amount of wear (mm) |
|---|---|---|---|---|---|---|---|---|---|
| inventive products | | | | | | | | | |
| 1 | 90Cu-5Pb-5Sn | 120 | 20Cu-80Pb | 20 | | | 125 | 110 | 5 |
| 2 | 90Cu-5Pb-5Sn | 120 | 30Cu-70Pb | 50 | | | 120 | 115 | 4 |
| 3 | 90Cu-5Pb-5Sn | 120 | 40Cu-60Pb | 65 | | | 120 | 115 | 4 |
| 4 | 90Cu-5Pb-5Sn | 120 | 50Cu-50Pb | 90 | | | 120 | 120 | 3.5 |
| 5 | 90Cu-5Pb-5Sn | 120 | 60Cu-40Pb | 120 | | | 117.5 | 120 | 3 |
| 6 | 90Cu-5Pb-5Sn-0.5P | 190 | 70Cu-30Pb | 150 | | | 115 | 125 | 2.5 |
| 7 | 90Cu-5Pb-5Sn-0.5P | 190 | 80Cu-20Pb | 180 | | | 115 | 125 | 2 |
| 8 | 90Cu-5Pb-5Sn | 120 | 50Cu-50Pb | 90 | 88Pb-10Sn-2Cu | 10 | 125 | 120 | 5 |
| 9 | 80Cu-17Pb-3Sn | 90 | 30Cu-70Pb | 50 | | | 125 | 115 | 4 |
| 10 | 80Cu-17Pb-3Sn | 90 | 30Cu-70Pb | 50 | 88Pb-10Sn-2Cu | 10 | 130 | 115 | 5.5 |
| 11 | 90Al-4Sn-6Si | 100 | 30Cu-70Pb | 50 | | | 127.5 | 115 | 4 |
| 12 | 90Al-4Sn-6Si | 100 | 30Cu-70Pb | 50 | 88Pb-10Sn-2Cu | 10 | 130 | 112.5 | 5.5 |
| 13 | 90Cu-5Pb-5Sn | 120 | 45Cu-50Pb-5In | 90 | | | 125 | 117.5 | 4 |
| 14 | 90Cu-5Pb-5Sn | 120 | 45Cu-50Pb-5Ag | 90 | | | 120 | 125 | 3 |
| comparative products | | | | | | | | | |
| 1 | 90Cu-5Pb-5Sn | 120 | | | 88Pb-10Sn-2Cu | 10 | 120 | 80 | 13 |
| 2 | 90Al-4Sn-6Si | 100 | | | 88Pb-10Sn-2Cu | 10 | 120 | 65 | 12 |
| 3 | 90Cu-5Pb-5Sn | 120 | 10Cu-90Pb | 14 | | | 125 | 80 | 8 |
| 4 | 90Cu-5Pb-5Sn | 120 | 90Cu-10Pb | 240 | | | 80 | 90 | 2 |

The bearing alloy layer 2 may be made of a Cu-based alloy or a Al-based alloy. As the Cu-based alloy, it is preferred to use a Cu-based alloy containing 5 to 30 mass % Pb and the balance Cu and incidental impurities. As the Al-based alloy, it is preferred to use an Al-based alloy containing not more than 20 mass % Sn and the balance Al (aluminum) and incidental impurities. In this case, it is preferred that the content of Pb or Sn (which is a soft metal) contained in the bearing alloy layer 2 (, that is, the Cu-based alloy or the Al-based alloy layer) is less than the content of Pb contained in the coating layer 3. The Cu-based alloy layer may be bonded onto the steel back metal layer 1 by sintering, and the Al-based alloy layer may be bonded onto the steel back metal layer by pressure-bonding after the Al-based alloy has been formed into a sheet by a continuous casting process.

Figure 2:
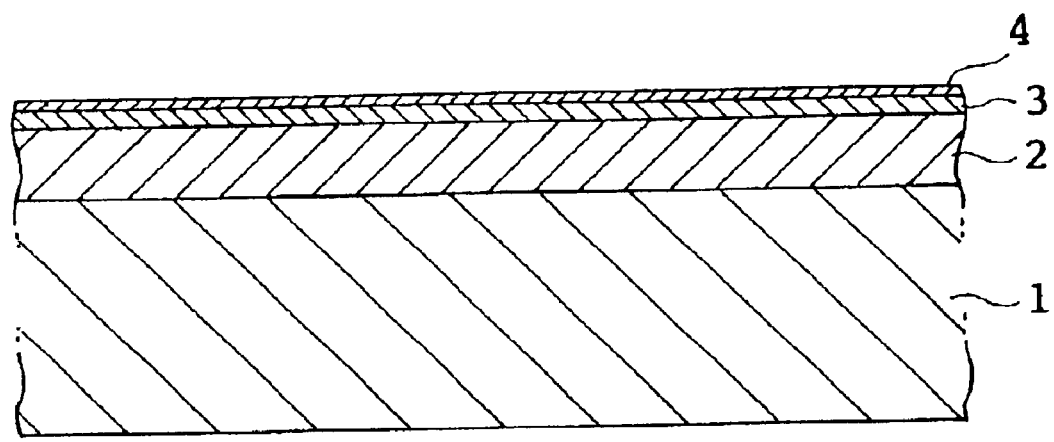
FIG. 2 is a partial, sectional view of a multi-layer sliding material according to another embodiment of the invention.

FIG. 2 shows a partial cross section of a multi-layer sliding material according to another embodiment of the invention. The difference between ones shown in FIGS. 1 and 2 resides in a conforming layer 4 bonded onto the coating layer 3. The conforming layer 4 is made of an alloy consisting of not less than 80 mass % Pb, and at least one optional element not more than 20 mass % in total selected from the group consisting of Sn and Cu.

In order to confirm the characteristics of the multi-layer sliding material according to each of the embodiments, there In each of the products Nos. 1 to 10, 13 and 14 relating to the invention, the Cu-based alloy layer was bonded onto the steel back metal layer, and the coating layer was bonded onto the bearing alloy layer. Further, in each of the products Nos. 8 and 10, the conforming layer was bonded onto the coating layer. In each of the products Nos. 11 and 12 relating to the invention, the bearing alloy layer was made of the Al-based alloy, in each of which products Nos. 11 and 12 the bonding layer of Ni was provided between the bearing alloy layer and the coating layer. Further, in No.12, the conforming layer was bonded onto the coating layer.

In the comparative product No.1, the Cu-based alloy layer was bonded onto the steel back metal layer, onto which Cu-based alloy layer the conforming layer was bonded. In each of the comparative products Nos. 3 and 4, the Cu-based alloy layer was bonded onto the steel back metal layer, onto which Cu-based alloy layer the coating layer was bonded. In the comparative product No. 2, the Al-based alloy layer was bonded onto the steel back metal layer, onto which Al-based alloy layer the bonding layer was bonded, onto which bonding layer the conforming layer was bonded.

In each of the products Nos. 1 to 14 relating to the invention, the thickness of the coating layer was 15 μm. In each of the products Nos. 8, 10 and 12 relating to the invention, the thickness of the conforming layer was 5 μm. In each of the comparative products Nos. 1 to 4, the thickness of each of the coating layer and the conforming layer was 15 µm.

Regarding each of the products Nos. 1 to 14 relating to the invention and the comparative products Nos. 1 to 4 were performed a seizure test, a fatigue test and a wear test, the results thereof being shown in Table 1. The conditions of each of the seizure test, the fatigue test and the wear test are shown in Table 2.

TABLE 2

| method of test | seizure test | fatigue test | wear test |
|---|---|---|---|
| seize of bearing | diameter 53 mm × width 13 mm | diameter 53 mm × width 17 mm | outer diameter 27.2 mm × inner diameter 22 oil groove 8 mm |
| rotation rate | 3600 rpm | 3250 rpm | speed: 2 m/s |
| lubricant | VG68 | VG68 | SAE#30 |
| feed rate of lubricant | 12.5 ml/min | oil pressure 0.49 Mpa | oil bath |
| temperature of fed lubricant | 100° C. | 100° C. | 25° C. |
| shaft material | S55C | S55C | S55C |
| other | | | specific load: 9 MPa time: 4 h |

As apparent from the test results, each of the products Nos. 1 to 14 relating to the invention is superior in each of the fatigue resistance and the wear resistance in comparison with the comparative products Nos. 1 and 2 in each of which the conforming layer was bonded onto the conventional bearing alloy layer. In each of the products Nos. 1 to 7 relating to the invention and the comparative products Nos. 3 and 4, the anti-seizure property is deteriorated as the hardness of the coating layer increases, and the fatigue resistance increases as the hardness of the coating layer increases, however, the excessive increase in the hardness (as shown in the comparative product No. 4) causes the decrease in toughness with the result that the fatigue resistance is deteriorated.

In the product No. 13 relating to the invention in which In is added in the coating layer, the effect of In which is a soft metal is brought about regarding the anti-seizure property. In the product No. 14 relating to the invention in which Ag is added in the coating layer, the fatigue resistance is enhanced without deteriorating the anti-seizure property because Ag acts to strengthen the coating layer and because Ag itself is relatively good in anti-seizure property.

The present invention is not limited to the embodiments shown in the drawings, that is, the present invention is not limited to ones used to produce the bearings of engines, and the present invention can be modified variously within the scope of the claims.

What is claimed is:

1. A multi-layer sliding material, comprising a back metal layer, a bearing alloy layer bonded onto the back metal layer, and a coating layer bonded onto the bearing alloy layer, said coating layer being made of an alloy consisting of 20 to 80 mass % Pb, and the balance Cu and incidental impurities.

2. A multi-layer sliding material according to claim 1, said bearing alloy layer being made of a Cu-based alloy containing 5 to 30 mass % Pb.

3. A multi-layer sliding material according to claim 2, further comprising
   a conforming layer containing not less than 80 mass % Pb which conforming layer is bonded onto the coating layer,
   wherein said coating layer is less hard than said bearing alloy layer, and said conforming layer is less hard than said coating layer.

4. A multi-layer sliding material according to claim 2, further comprising
   a conforming layer made of an alloy consisting of not less than 80 mass % Pb, and at least one optional element not more than 20 mass % in total selected from the group consisting of Sn and Cu which conforming layer is bonded onto the coating layer,
   wherein said coating layer is less hard than said bearing alloy layer, and said conforming layer is less hard than said coating layer.

5. A multi-layer sliding material according to claim 1, said bearing alloy layer being made of an Al-based alloy containing not more than 20 mass % Sn.

6. A multi-layer sliding material according to claim 5, further comprising
   a conforming layer containing not less than 80 mass % Pb which conforming layer is bonded onto the coating layer,
   wherein said coating layer is less hard than said bearing alloy layer, and said conforming layer is less hard than said coating layer.

7. A multi-layer sliding material according to claim further comprising
   a conforming layer made of an alloy consisting of not less than 80 mass % Pb, and at least one optional element not more than 20 mass % in total selected from the group consisting of Sn and Cu which conforming layer is bonded onto the coating layer,
   wherein said coating layer is less hard than said bearing alloy layer, and said conforming layer is less hard than said coating layer.

8. A multi-layer sliding material according to claim 1, further comprising
   a conforming layer containing not less than 80 mass % Pb which conforming layer is bonded onto the coating layer,
   wherein said coating layer is less hard than said bearing alloy layer, and said conforming layer is less hard than said coating layer.

9. A multi-layer sliding material according to claim 1, further comprising
   a conforming layer made of an alloy consisting of not less than 80 mass % Pb, and at least one optional element not more than 20 mass % in total selected from the group consisting of Sn and Cu which conforming layer is bonded onto the coating layer,
   wherein said coating layer is less hard than said bearing alloy layer, and said conforming layer is less hard than said coating layer.

10. The multi-layer sliding material of claim 1, wherein
    each of Pb and Cu are substantially evenly dispersed in said coating layer initially in an amorphous state, and which Pb and Cu become precipitated as crystal grains during use of said multi-layer sliding material,
    said multi-layer sliding material optionally further comprising a conforming layer containing not less than 80 mass % Pb bonded onto said coating layer, said conforming layer having a hardness range of 5 to 20 Hv and a thickness of 2–10 µm.

11. A multi-layer sliding material, comprising a back metal layer, a bearing alloy layer bonded onto the back metal layer, and a coating layer bonded onto the bearing alloy layer,
    said coating layer being made of an alloy consisting of 20 to 80 mass % Pb, not more than 10 mass % of Ag, and the balance Cu and incidental impurities.

12. A multi-layer sliding material according to claim 11, said bearing alloy layer being made of a Cu-based alloy containing 5 to 30 mass % Pb.

13. A multi-layer sliding material according to claim 12, further comprising a conforming layer containing not less than 80 mass % Pb which conforming layer is bonded onto the coating layer, wherein said coating layer is less hard than said bearing alloy layer, and said conforming layer is less hard than said coating layer.

14. A multi-layer sliding material according to claim 12, further comprising a conforming layer made of an alloy consisting of not less than 80 mass % Pb, and at least one optional element not more than 20 mass % in total selected from the group consisting of Sn and Cu which conforming layer is bonded onto the coating layer, wherein said coating layer is less hard than said bearing alloy layer, and said conforming layer is less hard than said coating layer.

15. A multi-layer sliding material according to claim 11, said bearing alloy layer being made of an Al-based alloy containing not more than 20 mass % Sn.

16. A multi-layer sliding material according to claim 15, further comprising a conforming layer containing not less than 80 mass % Pb which conforming layer is bonded onto the coating layer, wherein said coating layer is less hard than said bearing alloy layer, and said conforming layer is less hard than said coating layer.

17. A multi-layer sliding material according to claim 15, further comprising a conforming layer made of an alloy consisting of not less than 80 mass % Pb, and at least one optional element not more than 20 mass % in total selected from the group consisting of Sn and Cu which conforming layer is bonded onto the coating layer, wherein said coating layer is less hard than said bearing alloy layer, and said conforming layer is less hard than said coating layer.

18. A multi-layer sliding material according to claim 11, further comprising a conforming layer containing not less than 80 mass % Pb which conforming layer is bonded onto the coating layer, wherein said coating layer is less hard than said bearing alloy layer, and said conforming layer is less hard than said coating layer.

19. A multi-layer sliding material according to claim 11, further comprising a conforming layer made of an alloy consisting of not less than 80 mass % Pb, and at least one optional element not more than 20 mass % in total selected from the group consisting of Sn and Cu which conforming layer is bonded onto the coating layer, wherein said coating layer is less hard than said bearing alloy layer, and said conforming layer is less hard than said coating layer.

20. A multi-layer sliding material, comprising a back metal layer, a bearing alloy layer bonded onto the back metal layer, and a coating layer bonded onto the bearing alloy layer, said coating layer being made of an alloy consisting of 20 to 80 mass % Pb, at least one element of from not less than 5 mass % to not more than 10 mass % in total selected from the group consisting of In, Sb and Ag, and the balance Cu and incidental impurities.

* * * * *